United States Patent
Williams et al.

(10) Patent No.: US 11,829,932 B2
(45) Date of Patent: *Nov. 28, 2023

(54) METHODS, SYSTEMS, AND DEVICES FOR DETECTING AND RESOLVING RISKS ASSOCIATED WITH SHIPPED OBJECTS

(71) Applicant: FedEx Corporate Services, Inc., Collierville, TN (US)

(72) Inventors: Amber Moriah Williams, Memphis, TN (US); Chris Swearingen, Memphis, TN (US); Cheri Bailey Shirokova, Germantown, TN (US)

(73) Assignee: FedEx Corporate Services, Inc., Collierville, TN (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/362,073

(22) Filed: Jun. 29, 2021

(65) Prior Publication Data

US 2021/0326804 A1 Oct. 21, 2021

Related U.S. Application Data

(63) Continuation of application No. 13/887,463, filed on May 6, 2013, now Pat. No. 11,080,644.

(51) Int. Cl.
*G06Q 10/08* (2023.01)
*G06Q 10/0833* (2023.01)

(52) U.S. Cl.
CPC ............... *G06Q 10/0833* (2013.01)

(58) Field of Classification Search
CPC .. G06Q 10/08; G06Q 10/0833; G06Q 10/087; G06Q 10/083
See application file for complete search history.

(56) References Cited

U.S. PATENT DOCUMENTS

| 6,058,374 A | 5/2000 | Guthrie et al. |
| 8,145,577 B2 | 3/2012 | Krodger, Jr. |

(Continued)

FOREIGN PATENT DOCUMENTS

| CN | 101160598 A | 4/2008 |
| CN | 102572682 A | 7/2012 |
| CN | 102572682 B | 7/2012 |

OTHER PUBLICATIONS

Christensen, Jorgen, et al. Innovation in Truck Technologies. Paris: Organisation for Economic Cooperation and Development (OECD), 2010. ProQuest. Web. Jun. 21, 2023 (Year: 2010).*

(Continued)

*Primary Examiner* — Michael P Harrington
(74) *Attorney, Agent, or Firm* — Finnegan, Henderson, Farabow, Garrett & Dunner LLP

(57) ABSTRACT

Methods, systems, and devices are disclosed for resolving a risk associated with a shipped physical object. The methods and servers comprise associating a time with a geographical region. The methods and servers also comprise receiving a set of locations associated with transport of a physical object. In addition, the methods and servers comprise determining that the set of locations fails to satisfy a condition associated with the time and the geographical region. The sensor devices report location data to a server at a first time interval, wherein the location data fails to satisfy a condition associated with a time and a geographical region. The sensor devices also receive an indication of a panic mode. In addition, the sensor devices also report location data to the server at a second time interval, wherein the second time interval is different than the first time interval.

20 Claims, 9 Drawing Sheets

(56) References Cited

U.S. PATENT DOCUMENTS

| | | |
|---|---|---|
| 8,314,704 B2 | 11/2012 | Cova et al. |
| 8,555,355 B2 | 10/2013 | Rathbun |
| 9,177,282 B2 | 11/2015 | Stevens et al. |
| 9,974,042 B2 | 5/2018 | Skaaksrud |
| 10,438,162 B2 | 10/2019 | Sharma et al. |
| 10,990,922 B1 | 4/2021 | Subramanian et al. |
| 2003/0193414 A1 | 10/2003 | Jones |
| 2003/0225707 A1 | 12/2003 | Ehrman |
| 2006/0109106 A1 | 5/2006 | Braun |
| 2006/0220842 A1 | 10/2006 | Breed |
| 2006/0229895 A1 | 10/2006 | Kodger, Jr. |
| 2007/0285240 A1 | 12/2007 | Sensenig |
| 2008/0125964 A1 | 5/2008 | Carani et al. |
| 2011/0018707 A1 | 1/2011 | Dobson et al. |
| 2011/0074587 A1 | 3/2011 | Hamm |
| 2011/0193710 A1 | 8/2011 | McIlvain |
| 2012/0131151 A1 | 5/2012 | Wang |
| 2012/0235781 A1 | 9/2012 | Donlan |
| 2012/0310854 A1 | 12/2012 | Cova et al. |
| 2015/0262123 A1 | 9/2015 | Sharma et al. |

OTHER PUBLICATIONS

Bhuptani, et al.; RFID Field Guide Deploying Radio Frequency Identification Systems; Feb. 2005; Prentice Hall; USA (292 pages).
Bajpai, et al.; Provisional Application; *Location Privacy Enforcement in a Location-Based Services Platform*; Dec. 17, 2008 (22 pages).
Geofencing, A Useful Way to Corral Your Devices; posted by Katie Lane; Cisco Meraki; Sep. 11, 2013; (3 pages). https://web.archive.org/web/20131023085003/https://meraki.cisco.com/blog/2013/09/geofencing-a-useful-way-to-corral-your-devices/.
Heydon; Bluetooth Low Energy the Developer's Handbook; Oct. 2012; Prentice Hall; USA (368 pages).
Guidelines for Seafood Retailers; Govt. of Australia Dept. of Fisheries, Feb. 2002 (45 pages).
An Analysis of the Requirements, Current Conditions and Opportunities for Traceability in the British Columbia Seafood Sector; Jun. 2005 (177 pages).
SiLabs; Optimizing Current Consumption in Bluetooth Low Energy Devices; Version 2.13 (https://docs.silabs.com/bluetooth/2.13/) (12 pages).
Tiwari: An Introduction to QR Code Technology; *2016 International Conference on Information Technology*; IEEE Xplore (6 pages).
Vice Article: How the Railroad Industry Invented, Then Immediately Discarded, The Barcode; Oct. 24, 2017 (https://www.vice.com/en/article/qv38wp/how-the-railroad-industry-invented-then-immediately-discarded-the-barcode) (6 pages).
Extended European Search Report dated Dec. 9, 2016, for EP Appl. No. 14730272.3.
Examiner's Report of Canadian Application No. 2,911,283, dated Feb. 10, 2021 (4 pp).
Clancy, S., (2005), Get on the Right Track, Motor Transport, 14-15, retrieved from https://dialog.proquest.com/professional/docview/228677226?accountid=131444 (Year: 2005).
Birkland, C. (2005), Leveraging asset tracking, Fleet Equipment, 31(3), 6, retrieved from https://dialog.proquest.com/professional/docview/216171723?accountid=131444 (Year 2005).
Clancey, S. (2011), Keep on Tracking, Commercial Motor, 214(5432), 44-47, retrieved from https://dialog.proquest.com/professional/docview/869067376?accountid=131444 (Year 2011).
Third Examiner's Report of Chinese Application No. 201480038284.1, dated Dec. 13, 2019 (13 pp).
Examiner's Report of Canadian Application No. 2,911,283, dated Apr. 24, 2020 (6 pp).
Second Office Action of Chinese Application No. 201480038284.1 dated Jul. 15, 2019 (17 pp).
National Intellectual Property Administration, P.R. China, First Office Action in corresponding Chinese Patent Application No. 201480038284.1 (dated Dec. 26, 2018), 18 pp.
International Searching Authority, Notification of Transmittal of the International Search Report and the Written Opinion of the International Search Authority, dated Dec. 1, 2014, 8 pp.

\* cited by examiner

900 — Geofence Triggers:

Enter Destination w/ Time GeoFence By

5:00 PM ▼ | United States/Memphis (UTC - 06:00) ▼

02/21/2013

FIG. 9 ns, systems, and devices for detecting and resolving risks associated with shipped objects

CROSS REFERENCE TO RELATED APPLICATIONS

This application is a continuation of U.S. patent application Ser. No. 13/887,463, filed May 6, 2013, the disclosure of which is hereby incorporated by reference in its entirety.

TECHNICAL FIELD

The present disclosure relates to the field of shipping and, more particularly, methods, systems, and devices for detecting and resolving risks associated with shipped objects.

BACKGROUND

Information regarding shipped objects (e.g., packages, envelopes, or other physical objects) is often useful for various entities involved in the shipping process. For example, status information of a shipped object may be useful for a sender, a receiver, or the entity responsible for managing the shipping process. Such status information may include, for example, whether a shipped object has arrived at its destination or the latest known location of a shipped object during transit from an origin to the destination.

Location information is commonly provided by updating a location associated with a shipped object when the object arrives to a specific location. For example, upon arrival at an intermediary shipping facility, a shipped object's latest known location may be updated to reflect a location associated with the intermediary shipping facility. However, existing techniques for tracking a shipped object are often limited in usefulness when situations arise that may be a risk to a shipped object. For example, existing techniques for tracking a shipped object are often limited in usefulness for a shipped object that is off pace (e.g., the shipped object is delayed) or off track (e.g., the shipped object has deviated from a planned route) because existing techniques frequently rely on a shipped object passing through facilities having known locations.

Improvements in techniques for detecting and resolving risks associated with shipped objects are desirable.

SUMMARY

In one disclosed embodiment, a method for a shipped physical object is disclosed. The method comprises associating a time with a geographical region, receiving a set of locations associated with transport of a physical object, and determining, using a processor, that the set of locations fails to satisfy a condition associated with the time and the geographical region.

In another disclosed embodiment, a server for a shipped physical object is disclosed. The server comprises a processor and memory. The memory has instructions which, when executed by the processor, cause the server to perform operations comprising associating a time with a geographical region, receiving a set of locations associated with transport of a physical object, and determining, using a processor, that the set of locations fails to satisfy a condition associated with the time and the geographical region.

In another disclosed embodiment, a sensor device is disclosed. The sensor device comprises a sensor, a transceiver, a processor, and memory. The memory has instructions which, when executed by the processor, cause the sensor device to perform operations comprising reporting location data, captured by the sensor, to a server using the transceiver at a first time interval, wherein the location data fails to satisfy a condition associated with a time and a geographical region, receiving, using the transceiver, an indication of a panic mode, and reporting location data, captured by the sensor, to the server using the transceiver at a second time interval, wherein the second time interval is different than the first time interval.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

FIG. 9 illustrates an example screenshot of a user interface in accordance with the disclosed embodiments.

DETAILED DESCRIPTION

Reference will now be made in detail to the example embodiments, which are illustrated in the accompanying drawings. Wherever possible, the same reference numbers will be used throughout the drawings to refer to the same or like parts.

Shipped object location information, as well as other environmental information associated with a shipped object, can be determined more accurately and frequently by including a sensor device with or near a shipped object. A server may store data that links a sensor device with one or more shipped objects, if, for example, one sensor device is placed in a container that includes a plurality of shipped objects. As sensor data is received from the sensor device at the server, the data may be associated with shipped objects associated with the sensor device.

A shipped object may be associated with a number of risks, such as, for example, a risk that a shipped object is lost, damaged, or stolen. The location data received from a sensor device helps, for example, to improve handling of risks associated with a shipped object. For example, one or more geofences (i.e., selected or defined geographical areas) may be established. Times may be associated with the established geofences, such that, if a sensor device (and thus a shipped object) does not reach or exit a particular geofence by a selected time, a risk may be detected.

A number of operations can be performed based on a detected risk. For example, a panic button may be enabled in a user interface. If the panic button is selected, a number of actions may be performed such as, for example transmitting a panic mode indication to the sensor device to alter a reporting time interval of sensor data, notifying one or more parties associated with the shipped object that is associated with the sensor device, disabling any delay of location data about the shipped object that is available in a user interface, and/or creating a customer support case to resolve issues that will arise because of the determined risk.

Figure 1:
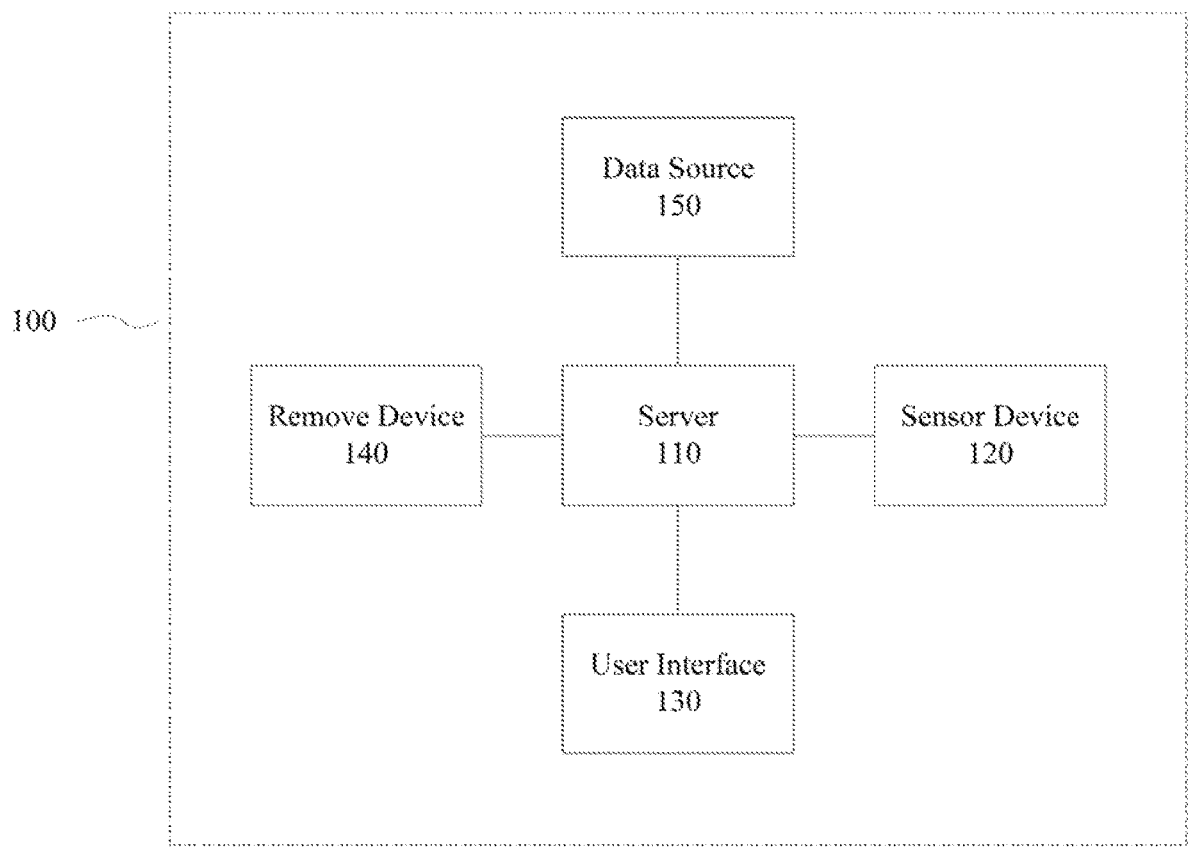
FIG. 1 illustrates an example system that may be used for implementing the disclosed embodiments.
Figure 2:
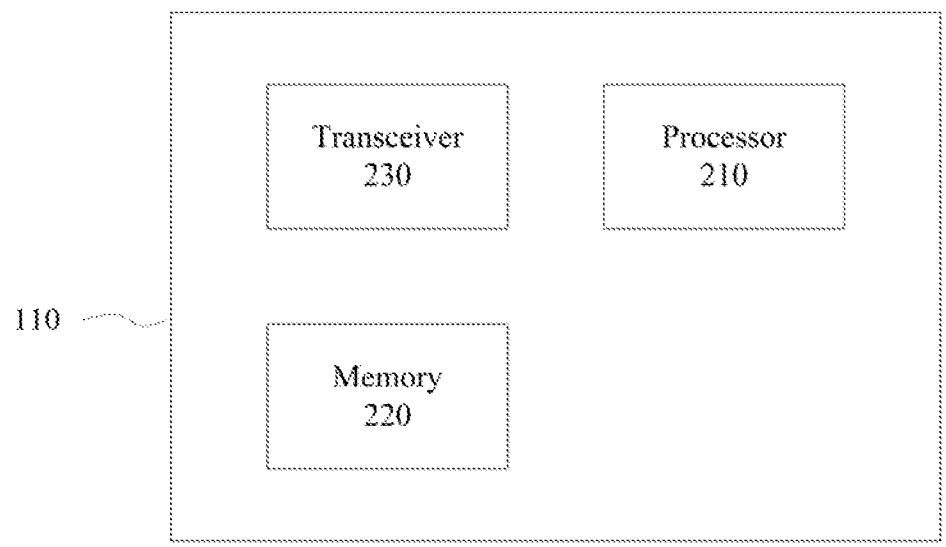
FIG. 2 illustrates an example device that may be used for implementing the disclosed embodiments.

FIG. 1 is a diagram illustrating an example system 100 that may be used for implementing the disclosed embodiments. System 100 includes, among other things, one or more servers 110, one or more sensor devices 120, one or more user interfaces 130, one or more remote devices 140, and one or more data sources 150. In some embodiments, as depicted in FIG. 2, server 110 includes, among other things, one or more processors 210, memory 220, and one or more transceivers 230. Processor 210 may be any processor suitable for the execution of a computer program including, by way of example, one or more general purpose microprocessors or special purpose microprocessors. Memory 220 may store computer program code that may be executed by the processor 210. Transceiver 230 may facilitate sending data to and receiving data from external sources (e.g., via the Internet or via a cellular network). For example, server 110 may be configured to send data to and receive data from a sensor device 120, a user interface 130, a remove device 140, and/or a data source 150. In some embodiments, memory 220 of server 110 also stores a database. The database may comprise, for example, data regarding the status (e.g., data regarding location, acceleration, motion, temperature, pressure, and/or other environmental parameters) of one or more shipped objects.

Figure 3:
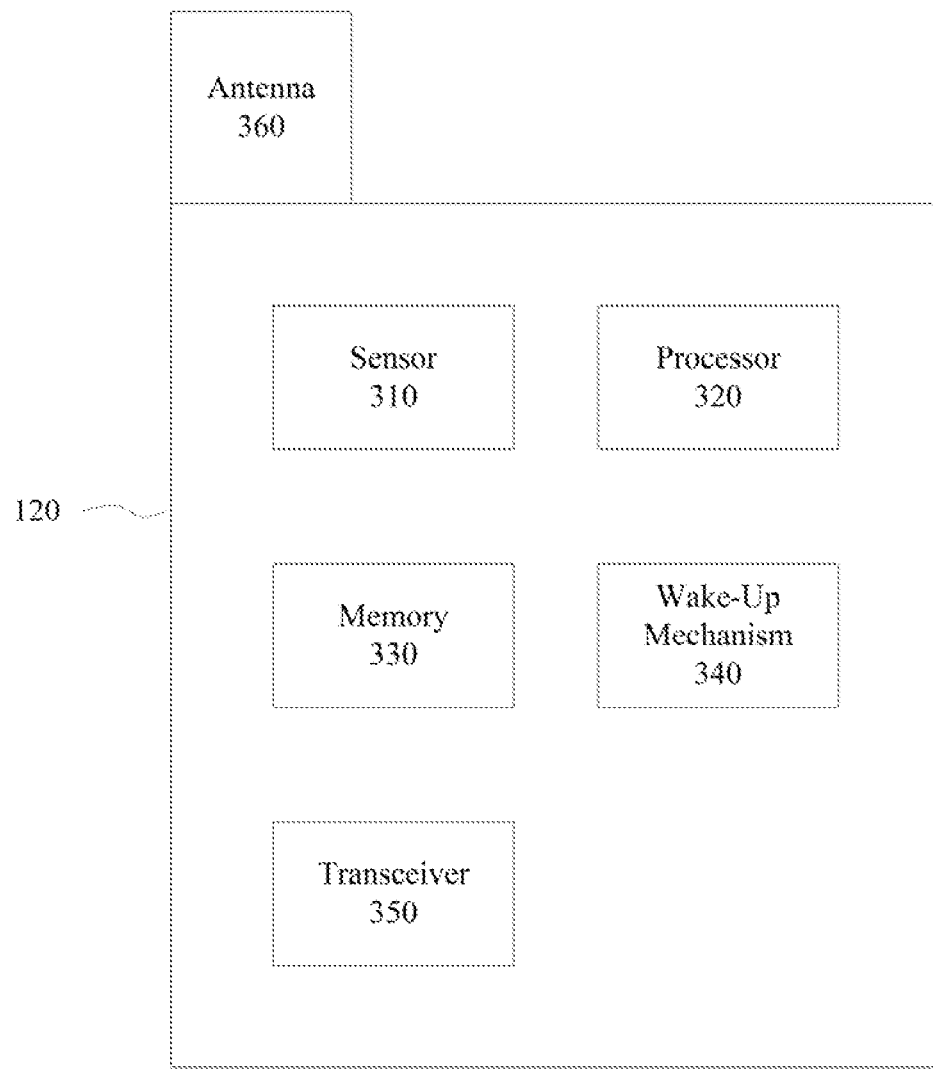
FIG. 3 illustrates an example device that may be used for implementing the disclosed embodiments.

In some embodiments, as depicted in FIG. 3, sensor device 120 includes, among other things, one or more sensors 310, one or more processors 320, memory 330, one or more wake-up mechanisms 340, one or more transceivers 350, and one or more antennas 360. Sensor(s) 310 may measure one or more environmental parameters associated with the sensor device 120. For example, a sensor 310 may measure acceleration, motion, temperature, pressure, location, and/or other environmental parameters. For example, a sensor 310 may be a GPS sensor that measures the GPS coordinates associated with sensor device 120. Memory 330 may store computer program code that may be executed by the processor 320. Processor 320 may be configured to monitor sensor(s) 310. Processor 320 may, for example, store monitored sensor data in memory 330 and/or may transmit monitored sensor data via transceiver 350 and antenna 360. While sensor device 120 is depicted as a single device, sensor device 120 may also be a set of devices that operate in conjunction. For example, a set of devices may include sensors 310 that send monitored sensor data to another device that transmits monitored sensor data via a transceiver 350 and antenna 360.

In some embodiments, sensor device 120 is capable of entering a "sleep" mode in which some or all of its components are powered off or put in a low-power state. Wake-up mechanism 340 may receive power in such a sleep mode and may be configured to cause sensor device 120 to resume normal operation upon receiving a signal to exit sleep mode. For example, wake-up mechanism 340 may be connected to a clock (not shown), wherein, at a predetermined time determined based on the clock, the wake-up mechanism 340 causes sensor device 120 to resume normal operation.

Transceiver 350 may facilitate sending data to and receiving data from external sources (e.g., via the Internet or via a cellular network). Transceiver 370 may utilize antenna 360 to send and receive data via, for example, a cellular network. In some embodiments, memory 330 stores data regarding the destination for data obtained from sensor(s) 310. Sensor device 120 may, for example, be configured to transmit, using transceiver 350 and antenna 360, data from sensor(s) 310 to server 110. In some embodiments sensor device 120 and server 110 interact directly. However, in other embodiments, any number of intermediary devices may route data sent between sensor device 120 and server 110.

In some embodiments, memory 330 stores a predetermined transmission rate. Sensor data from sensor(s) 310 may be transmitted, using transceiver 350 and antenna 360, to server 110 at a rate that corresponds to the predetermined transmission rate. In some embodiments, if data temporarily cannot be sent from sensor device 110 (e.g., due to a temporary loss of cellular reception or due to the sensor device 110 being in an "airplane" mode in which the transceiver 350 and antenna 360 are turned off), data from sensor(s) 310 may be temporary stored in memory 330 until data can be sent from sensor device 110, and, optionally, may be sent in a batch to server 110.

In some embodiments, the sensor device 120 is capable of receiving notifications regarding altered modes of operation. For example, sensor device 120 may be notified that it should enter a special mode in which sensor data is transmitted to server 110 at an altered time interval.

In some embodiments, sensor device 120 is placed within or near a shipped object. Server 110 may store data that associates a shipped object identifier with sensor device 120. In some embodiments, more than one shipped object may be associated with a single sensor device 120. Thus, as data is received by server 110 from sensor device 120, the data may be associated with each shipped object that is associated with sensor device 120.

User interface 130 provides a user interface for accessing information regarding shipments. For example, user interface 130 may display a travelled path of a shipped object (based on a travelled path of sensor device 120) based on data stored in server 110. Moreover, user interface 130 may display historical and current alerts associated with a shipped object. For example, in some embodiments, server 110 may send user interface 130 an indication that a potential risk associated with a shipped object is present. The user interface 130 may be configured to display a panic button in response to the potential risk. In some embodiments, a panic button is a selectable visual indication that a panic mode may be entered. Thus, a user may select the panic button to cause various actions to occur, described in more detail below. A selection may be received in a number of ways, including, for example, a mouse click, a finger touch (e.g., if a user interface is displayed on a touch-sensitive screen), a textual entry, a spoken command, etc.

In some embodiments, user interface 130 is an application that is executed on server 110. In such embodiments, a user may use a device (e.g., a computer, a mobile phone, a laptop, etc.) to access the user interface 130 remotely. In other embodiments, however, user interface 130 could be executed locally on a user's device. In such embodiments, user interface 130 may obtain data from server 110. Moreover, user interface 130 may be a single user interface that users (e.g., registered senders or receivers of a shipped package) and administrators (e.g., individuals associated with the entity responsible for managing the shipping process) can access. Alternatively, user interface 130 may be two or more user interfaces configured for access by various entities (e.g., one user interface that can be accessed by users and another user interface, with greater authorization, that can be accessed by administrators).

System 100 may also include a number of remote devices 140. For example, a user may provide a phone number for a mobile device to receive alerts. In addition to, or as an alternative to, sending indications of potential risks to user interface 130, server 110 may send indications of potential risks to remote devices 140. For example, an indication of a potential risk may be sent to a user's mobile device, the mobile device may display a panic button, and the user may select the panic button to cause various actions to occur. Moreover, server 110 may be configured to send other information to remote devices 140. For example, server 110 may be configured to send remote devices 140 information in response to a determination that a panic button has been selected.

System 100 may also include a number of data sources 150. A data source 150 may be any source of data other than sensor device 120, including, for example, a schedule of flights, a weather forecast, traffic data, etc. Server 110 may access data sources 150 for a variety of reasons, such as, for example, to determine a travel path to a destination, including alternate travel paths once a shipped object is already in route to a destination, or to calculate an estimated time and/or distance to a location on the travel path.

Figure 4:
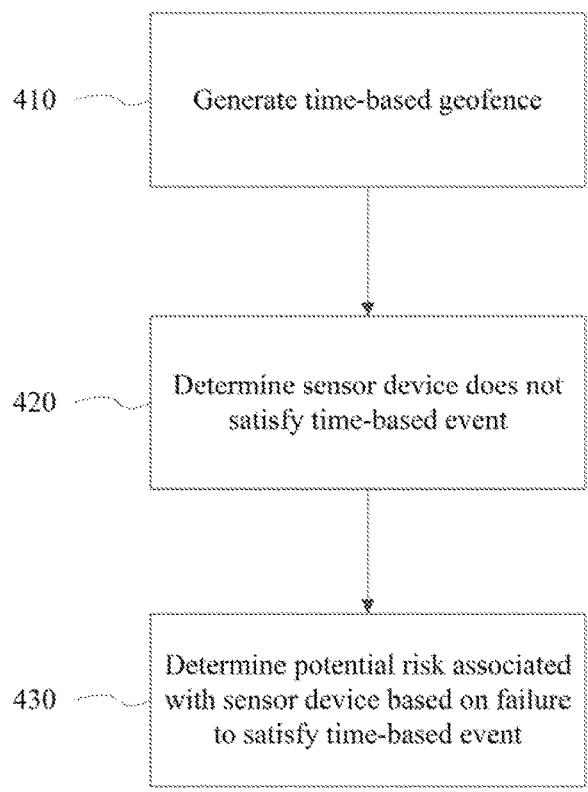
FIG. 4 illustrates an example method for determining a potential risk in accordance with the disclosed embodiments.

FIG. 4 illustrates an example method 400 for determining a potential risk. Method 400 begins with a generation of a time-based geofence (step 410). The term "geofence" refers to a selected or defined geographical area. For example, server 110 may store geographical areas surrounding a number of known locations. Thus, for example, a geofence may be generated for a geographical area surrounding an intermediary shipping facility that is on a shipped object's scheduled travel path. Moreover, a geofence can be generated for new locations. For example, a geofence may be generated for an area (e.g., 1 mile, 5 miles, 10 miles) surrounding the destination of a shipped object.

A "time-based geofence" refers to a geofence that is associated with one or more times. In some embodiments, a time is automatically associated with the generated geofence. For example, a time that is a predetermined amount of time before an estimated delivery time, or an estimated arrival to an intermediary geofence along a scheduled travel path, may be associated with the generated geofence.

Figure 8:
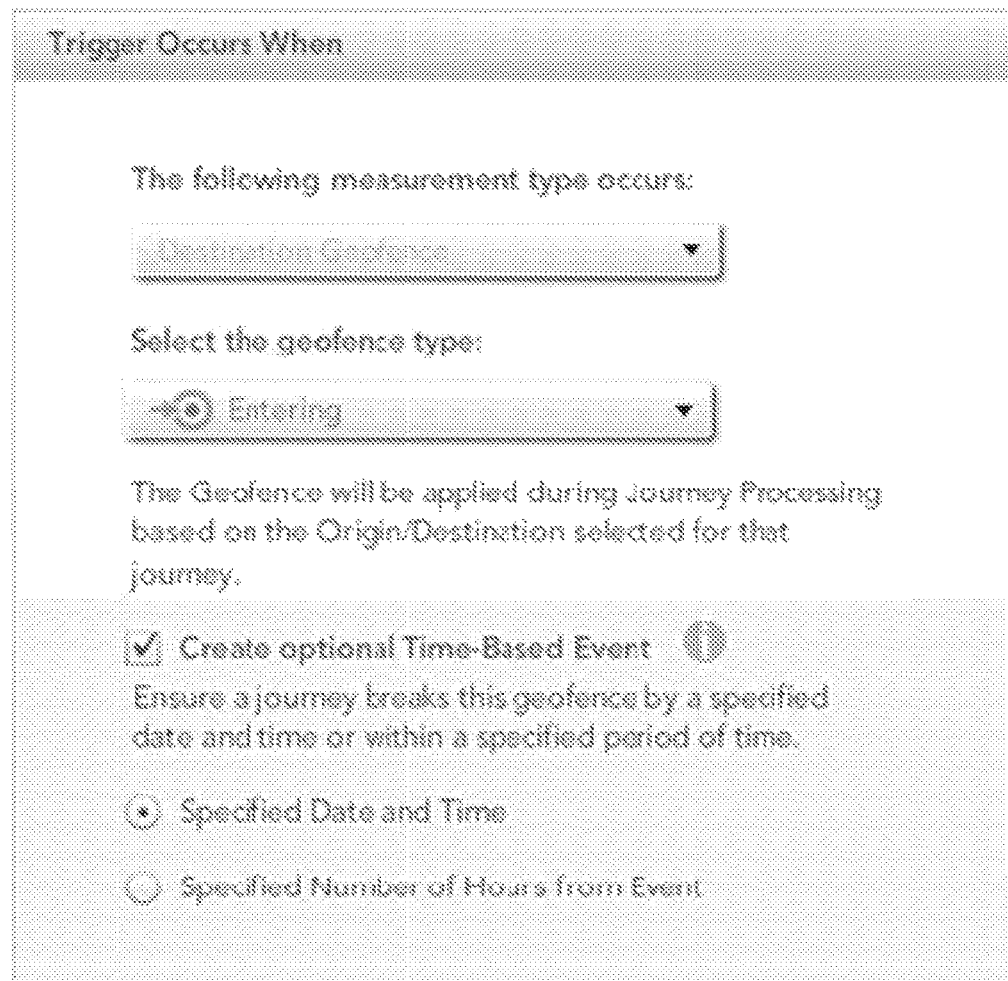
FIG. 8 illustrates an example screenshot of a user interface in accordance with the disclosed embodiments.

Alternatively, the time associated with a geofence may be selected by a user. For example, as depicted in FIG. 8, a user may be provided with a menu 800 that enables the user to indicate which geofence a time-based rule will apply to (e.g., a destination geofence or an intermediary geofence), what type of action is associated with the geofence (e.g., a shipped object entering a geofence or a shipped object exiting a geofence), whether to associate the geofence with a time (e.g., a time-based event), and whether the time should be a specific time or a specified number of hours from an event (e.g., a specified number of hours after the geofence is created, a specified number of hours after a journey for the shipped object begins, or a specified number of hours after an estimated time of arrival to, or departure from, the geofence). For example, as depicted in FIG. 9, a user may be provided with a menu 900 that enables the user to enter a time, a time zone, and a date to associate with a geofence.

In some embodiments, a determination is made that sensor device 120 has not satisfied a time based event (step 420). For example, a determination may be made that sensor device 120 has not reached any location within the time-based geofence by the time associated with the time-based geofence. Alternatively, for example, a determination may be made that sensor device 120 has not exited an area associated with the time-based geofence by the time associated with the time-based geofence.

To determine whether the sensor device 120 has not reached any location within the time-based geofence by the time associated with the time-based geofence, a history of the past locations of the sensor device 120 may be analyzed to determine if any location falls within an area associated with the time-based geofence by the time associated with the time-based geofence. Alternatively, for example, each location capture associated with the sensor device 120 may be compared to an area associated with the time-based geofence and a flag may be cleared once a location associated with the sensor device 120 falls within an area associated with the time-based geofence; a determination may be made as to whether the flag has been cleared at or before the time associated with the time-based geofence.

To determine whether the sensor device 120 has not exited an area associated with the time-based geofence by the time associated with the time-based geofence, a history of the past locations of the sensor device 120 may be analyzed to determine if any location falls outside of an area associated with the time-based geofence by the time associated with the time-based geofence. Alternatively, for example, each location capture associated with the sensor device 120 may be compared to an area associated with the time-based geofence and a flag may be cleared once a location associated with the sensor device 120 falls outside an area associated with the time-based geofence; a determination may be made as to whether the flag has been cleared at or before the time associated with the time-based geofence.

In some embodiments, a potential risk is determined based on a failure of the sensor device 120 to satisfy the time-based event (step 430). While the above process is explained with reference to one time-based geofence and one-time based event, more than one time-based geofence may be used for a shipped object and one that one time-based event may be applied to a time-based geofence. For example, a geofence may be generated and associated with both an expected entrance time and an expected exit time.

Figure 5:
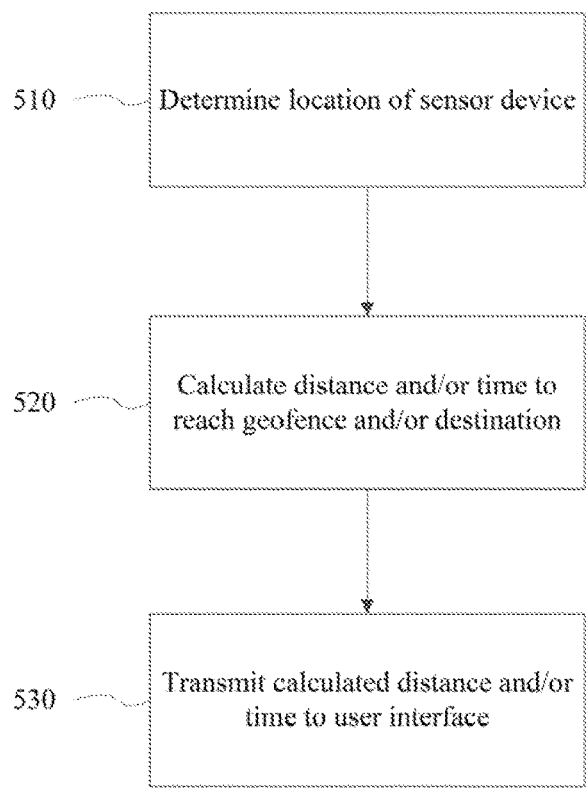
FIG. 5 illustrates an example method for determining distance and/or time in accordance with the disclosed embodiments.

FIG. 5 illustrates an example method 500 for determining an estimated distance or time to reach a destination or geofence for a shipped object. Method 500 begins with a determination of a location of a sensor device 120 associated with the shipped object (step 510). For example, server 110 may store a database which links a shipped object to a particular sensor device 120 being shipped with the shipped object. In some embodiments, sensor device 120 may automatically transmit server 110 its location, for example, at predetermined intervals. In such embodiments, a latest received location may be used. In other embodiments, server 110 may send sensor device 120 a location request and, in response to the location request, may receive a location of the sensor device 120.

In some embodiments, server 110 then calculates a distance and/or time to reach a shipped object's destination or a geofence before the destination (step 520). For example, server 110 may analyze past shipment data associated with the current location (e.g., the origin or an intermediary location determined from the location of the sensor device 120) and the destination or geofence location. For example, an estimated time and/or distance between a current location and a destination or geofence location may be determined based on past travel routes used for shipping an object from the current location to the destination or geofence location, based on, for example, an average time and/or distance of the past travel routes.

Other data may also be utilized to determine an estimated distance and/or time. For example, server 110 may determine from a data source 150 that one or more past travel routes are unavailable (e.g., due to road construction or inclement weather). Based on this additional data, some past travel routes may be ignored. Alternatively, for example, a weighted average may be calculated by assigning each past travel route a probability associated with the probability that the travel route will be used for the current shipped object.

In some embodiments, server 110 then transmits the calculated distance and/or time to user interface 130 (step 530). User interface 130 may enable a user or an administrator to view the estimated distance and/or time for a shipped object to reach a destination or geofence location.

Figure 6:
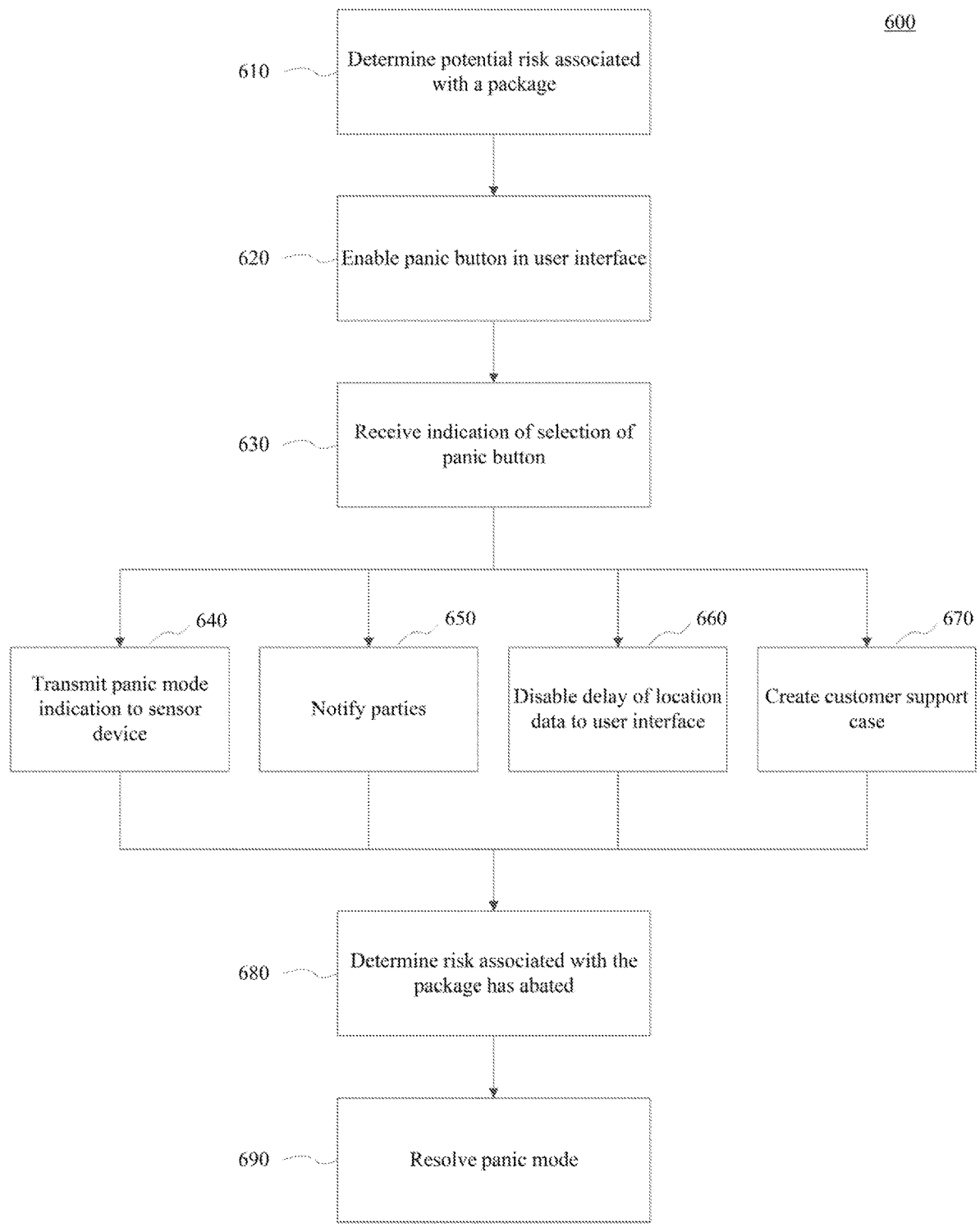
FIG. 6 illustrates an example method for implementing a panic button in accordance with the disclosed embodiments.

FIG. 6 illustrates an example method 600 for implementing a panic button. Method 600 begins with a determination of a potential risk associated with a shipped object (step 610). For example, as discussed above, a sensor device 120 may fail to enter or exit a time-based geofence by a particular time and a determination may be made that the sensor device 120 is associated with one or more shipped objects. Alternatively, for example, sensor data from sensor device 120 may indicate a risk based on, for example, a high or low temperature, a high or low acceleration, a high or low pressure, or a high or low speed. In some embodiments, the determination of a potential risk is made at the server 110. In other embodiments, the determination of a potential risk is made at the sensor device 120.

In some embodiments, based on the potential risk, server 110 enables a panic button in the user interface 130 (step 620). In some embodiments, the panic button may only be enabled when a potential risk is received from sensor device 120 and one or more additional conditions are satisfied. The one or more additional conditions may include, for example: the shipped object being high value or the shipped object containing perishable material. However, in other embodiments, a panic button may always be enabled in user interface 130 for one or more users of the user interface 130. Additionally, for example, an administrator may have access to the panic button even without an indication of a potential risk from sensor device 120. As discussed above, the panic button may be a selectable visual indication that a panic mode may be entered. A panic button may be selected in a number of ways, including, for example, a mouse click, a finger touch (e.g., when a user interface is displayed on a touch-sensitive screen), a textual entry, a spoken command, etc.

In some embodiments, server 110 receives an indication that the panic button has been selected (step 630). In response to the indication that the panic button has been selected, server 110 may perform a number of actions, either simultaneously or in sequence. For example, server 110 may perform one or more of the following actions: transmit a panic mode indication to sensor device 120 (step 640), notify one or more parties associated with the shipped object (step 650), disable a delay of location data available to the user interface 130 (step 660), and/or create a customer support case (step 670).

At step 640, sensor device 120 may receive the panic mode indication from the server 110. As discussed above, sensor device 120 may have a predetermined rate of transmitting its location and/or other environmental parameters (e.g., battery life, temperature, humidity, pressure, light, acceleration, or motion) to server 110. As discussed in more detail below, in response to receiving the panic mode indication, sensor device 120 may increase the rate in which it transmits its location/or other environmental parameters to server 110 for example, for a predetermined amount of time or until another indication is received that panic mode has been resolved. In some embodiments, the increased rate is predetermined (e.g., twice the rate of when panic mode is not active or as frequently as the device supports transmission). In other embodiments, the increased rate of location and environmental transmissions is received from server 110.

At step 650, the parties that are notified of the panic mode indication may include, for example, company security, a legal department, a police department closest to the shipped object's location, one or more monitoring or intervention groups, and/or all participants who have signed up to receive notifications regarding a particular shipped object (e.g., a shipped's object's sender and/or receiver).

To increase security for certain carriers, location data that is displayed in user interface 130 may ordinarily be delayed (e.g., by 30 minutes) when a panic mode is not active. At step 660, the delay may be removed such that the user interface 130 displays the latest known location data of a shipped object without any intentional delay for a predetermined amount of time or until another indication is received that panic mode has been resolved.

At step 670, a customer support case may be created. A customer support case may be used to ensure that any issues associated with the shipped object are handled and tracked, including, for example, any billing issues that arise by a shipped object being delayed, lost, stolen, or damaged.

In some embodiments, a determination may be made that the risk associated with the shipped object has abated (step 680). For example, if the potential risk was associated with a determination that a shipped object has not reached a time-based geofence by a predetermined time, a determination that the risk has abated may occur if the shipped object reaches the time-based geofence. Alternatively, or additionally, a determination may be made that the risk associated with the shipped object has abated if the shipped object is found at a secure location. For example, a determination may be made that the risk has abated because the shipped object is located at a known shipping facility and was delayed due to weather. Alternatively, or additionally, a determination may be made that the risk associated with the shipped object has abated if a particular button in user interface 130 is selected.

In some embodiments, based on the determination that the risk has abated, panic mode is resolved (step 690). For example, any changed settings that were made in steps 640-670 may be undone. Moreover, while the above process explains a single instance of a panic mode, a given shipped object may be associated with a panic mode more than once. That is, once a panic mode has been resolved, a panic mode may be entered into again.

Figure 7:
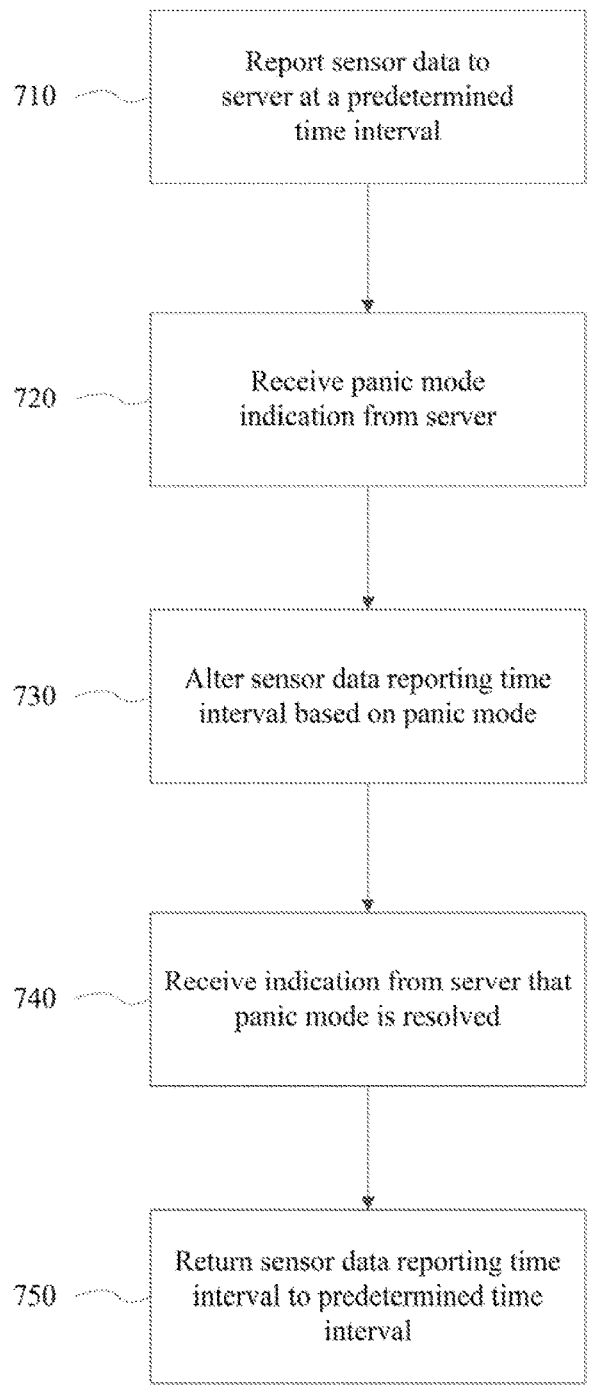
FIG. 7 illustrates an example method for implementing a panic button in accordance with the disclosed embodiments.

FIG. 7 illustrates an example method 700 for implementing a panic button. Method 700 begins with a sensor device 120 reporting sensor data to server 110 at a predetermined time interval (step 710). For example, as discussed above, sensor device 110 may store a predetermined time interval to use during normal operation.

In some embodiments, sensor device 120 receives a panic mode indication from server 110 (step 720). Based on the panic mode indication, sensor device 120 may alter the time interval at which it reports sensor data (step 730). For example, as discussed above, sensor device 120 may store an altered reporting time interval associated with panic mode or may receive an altered reporting time interval from server 110.

Sometime after receiving the panic mode indication, sensor device 120 may receive an indication from server 110 that panic mode has been resolved (step 740). Based on the indication that panic mode has been resolved, sensor device 120 may resume reporting sensor data at its predetermined time interval for normal operation (step 750).

While various operations are described above as being performed by server 110, in some alternative embodiments sensor device 120 performs some of or all of the operations described above as being performed by server 110. For example, a determination that a sensor device 130 has failed to satisfy a time-based geofence may be made by server 110 or by sensor device 120.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIGS. 4-7) can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for a shipped physical object, comprising:
    associating a time with a geographical region along an expected travel path of the shipped physical object;
    receiving location data at a first rate associated with a sensor device within or attached to the shipped physical object, the received location data comprising a set of locations;
    determining, using a processor, that the set of locations fails to satisfy a condition associated with the time and the geographical region;
    presenting a selectable panic button via a user interface on a device remote from the physical object, wherein the selectable panic button, following its selection, enables a panic mode associated with the determination that the set of locations fails to satisfy the condition;
    receiving, corresponding to enablement of the panic mode, the location data associated with the sensor device at a frequency greater than the first rate;
    storing the received location data received at the greater frequency; and
    notifying, in response to the enabled panic mode, a party associated with the physical object of the failed condition.

2. The method of claim 1, wherein the determination that the set of locations fails to satisfy the condition comprises a determination that the set of locations does not contain a location within the geographical region before the time.

3. The method of claim 1, wherein the determination that the set of locations fails to satisfy the condition comprises a determination that the set of locations only contains locations within the geographical region before the time.

4. The method of claim 1, further comprising:
    determining the time based on an expected arrival time to the geographical region or an expected departure time from the geographical region.

5. The method of claim 4, further comprising:
    determining the expected arrival time or the expected departure time based on past travel routes between a most recent location from the set of locations and the geographical region.

6. The method of claim 1, wherein the geographical region is a destination of the shipped physical object or an intermediary shipping facility.

7. The method of claim 1, wherein the physical object is a set of one or more packages, containers, or shipped articles.

8. The method of claim 1, further comprising:
    providing the set of locations to the user interface at a delay period from receiving the location data.

9. The method of claim 8, further comprising:
    reducing, in response to the enabled panic mode, the delay period.

10. The method of claim 1, further comprising:
    causing, in response to enablement of the panic mode, transmission of an indication of the enabled panic mode to the sensor device.

11. A system for a shipped physical object comprising:
    one or more processors; and
    memory having instructions which, when executed by the processor, cause the one or more processors to perform operations, comprising:
        associating a time with a geographical region along an expected travel path of the shipped physical object;
        receiving location data at a first rate associated with a sensor device within or attached to the shipped physical object, the received location data comprising a set of locations;
        determining, using a processor, that the set of locations fails to satisfy a condition associated with the time and the geographical region;
        presenting a selectable panic button via a user interface on a device remote from the physical object, wherein the selectable panic button, following its selection, enables a panic mode associated with the determination that the set of locations fails to satisfy the condition;
        receiving, corresponding to enablement of the panic mode, the location data associated with the sensor device at a frequency greater than the first rate;
        storing the received location data received at the greater frequency; and
        notifying, in response to the enabled panic mode, a party associated with the physical object of the failed condition.

12. The system of claim 11, wherein the determination that the set of locations fails to satisfy the condition comprises a determination that the set of locations does not contain a location within the geographical region before the time.

13. The system of claim 11, wherein the determination that the set of locations fails to satisfy the condition comprises a determination that the set of locations only contains locations within the geographical region before the time.

14. The system of claim 11, further comprising:
    determining the time based on an expected arrival time to the geographical region or an expected departure time from the geographical region.

15. The system of claim 14, further comprising:
    determining the expected arrival time or the expected departure time based on past travel routes between a most recent location from the set of locations and the geographical region.

16. The system of claim 11, wherein the geographical region is a destination of the shipped physical object or an intermediary shipping facility.

17. The system of claim 11, wherein the physical object is a set of one or more packages, containers, or shipped articles.

18. The system of claim 11, further comprising:
    providing the set of locations to the user interface at a delay period from receiving the location data.

19. The system of claim 18, further comprising:
    reducing, in response to the enabled panic mode, the delay period.

20. The system of claim 11, further comprising:
    causing, in response to enablement of the panic mode, transmission of an indication of the enabled panic mode to the sensor device.

* * * * *